United States Patent
Szewerenko et al.

(10) Patent No.: US 11,959,678 B2
(45) Date of Patent: *Apr. 16, 2024

(54) SYSTEM AND METHOD FOR DETERMINING EFFICIENCY OF CHILLERS

(71) Applicant: Johnson Controls Tyco IP Holdings LLP, Milwaukee, WI (US)

(72) Inventors: Leland John Szewerenko, Austin, TX (US); Joe Villani, York, PA (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/114,873

(22) Filed: Feb. 27, 2023

(65) Prior Publication Data

US 2023/0204269 A1    Jun. 29, 2023

Related U.S. Application Data

(63) Continuation of application No. 16/339,328, filed as application No. PCT/US2017/055396 on Oct. 5, 2017, now Pat. No. 11,592,224.

(Continued)

(51) Int. Cl.
F25B 49/02    (2006.01)

(52) U.S. Cl.
CPC .......... *F25B 49/02* (2013.01); *F25B 2500/19* (2013.01); *F25B 2700/151* (2013.01); *F25B 2700/21172* (2013.01); *F25B 2700/21173* (2013.01)

(58) Field of Classification Search
CPC ...... F25B 2700/151; F25B 2700/21172; F25B 2700/21173
See application file for complete search history.

(56) References Cited

U.S. PATENT DOCUMENTS

| 4,463,574 A | * | 8/1984 | Spethmann | .............. F24F 11/46 700/36 |
| 4,483,152 A | * | 11/1984 | Bitondo | .................. F25D 17/02 702/182 |

(Continued)

FOREIGN PATENT DOCUMENTS

| CA | 2492272 C | 4/2009 |
| CN | 1745282 A | 4/2010 |

(Continued)

OTHER PUBLICATIONS

International Search Report and Written Opinion for PCT Application No. PCT/US2017/055396 dated Jan. 2, 2018, 13 pgs.

(Continued)

*Primary Examiner* — Henry T Crenshaw
(74) *Attorney, Agent, or Firm* — Fletcher Yoder, P.C.

(57) ABSTRACT

The present disclosure relates to a method for determining an efficiency curve of a chiller that includes operating a chiller over a range of operating capacities, measuring a temperature of water entering the chiller at an initial capacity, measuring a temperature of water exiting the chiller at the initial capacity, measuring a power consumption of the chiller at the initial capacity, calculating an initial efficiency of the chiller at the initial capacity, measuring a plurality of temperatures of water entering the chiller at a plurality of capacities, measuring a plurality of temperatures of water exiting the chiller at each of the plurality of capacities, measuring a plurality of power consumptions at each of the plurality of capacities, calculating a plurality of efficiencies at each of the plurality of capacities, and generating an efficiency curve for the chiller with the initial efficiency and the plurality of efficiencies.

20 Claims, 6 Drawing Sheets

Related U.S. Application Data

(60) Provisional application No. 62/404,637, filed on Oct. 5, 2016.

(56) References Cited

U.S. PATENT DOCUMENTS

| | | | | |
|---|---|---|---|---|
| 4,745,758 A | * | 5/1988 | Putman | G05D 23/1912 60/676 |
| 4,768,346 A | * | 9/1988 | Mathur | G01L 3/26 702/182 |
| 5,083,438 A | * | 1/1992 | McMullin | F25B 49/005 702/45 |
| 6,085,532 A | * | 7/2000 | Sibik | F25B 49/02 62/177 |
| 2008/0067135 A1 | * | 3/2008 | Stanford | C02F 1/76 210/754 |
| 2008/0269672 A1 | * | 10/2008 | Say | A61M 5/1723 600/345 |
| 2011/0190946 A1 | * | 8/2011 | Wong | F24F 11/62 700/277 |
| 2016/0187899 A1 | * | 6/2016 | Lee | F24F 11/77 236/44 C |
| 2023/0204269 A1 | * | 6/2023 | Szewerenko | F25B 49/02 702/182 |

FOREIGN PATENT DOCUMENTS

| | | |
|---|---|---|
| CN | 102112818 A | 6/2011 |
| JP | S5832170 A | 2/1983 |
| WO | 2004042291 A2 | 5/2004 |

OTHER PUBLICATIONS

Korean Office Action for KR Application No. 10-2019-7012699 dated Jul. 1, 2020, 8 pgs.
Chinese Office Action for CN Application No. 201780073377.1 dated Nov. 13, 2020, 12 pgs.
Korean Notice of Allowance for KR Application No. 10-2019-7012699 dated Oct. 2, 2020, 2 pgs.

* cited by examiner

SYSTEM AND METHOD FOR DETERMINING EFFICIENCY OF CHILLERS

CROSS REFERENCE TO RELATED APPLICATIONS

This is a continuation application of U.S. patent application Ser. No. 16/339,328, filed Apr. 3, 2019, entitled "SYSTEM AND METHOD FOR DETERMINING EFFICIENCY OF CHILLERS," which is a U.S. National Stage Application of International Patent Application No. PCT/US2017/055396, entitled "SYSTEM AND METHOD FOR DETERMINING EFFICIENCY OF CHILLERS," filed Oct. 5, 2017, which claims priority from and the benefit of U.S. Provisional Patent Application No. 62/404,637, filed Oct. 5, 2016, entitled "SYSTEM AND METHOD FOR DETERMINING EFFICIENCY OF CHILLERS," each of which is hereby incorporated by reference in its entirety for all purposes.

BACKGROUND

The present disclosure is directed to a system and method for determining an efficiency of chillers. In particular, the present disclosure relates to a method in which an efficiency curve for a chiller is determined by measuring efficiencies of the chiller as it operates and providing the information to a building automation system.

The use of compressor-based cooling plants that employ multiple machines is a common method of providing cooling for medium and large commercial buildings and also for many industrial processes. Centrifugal chillers are usually driven by electricity but may also be driven by an engine or other power source. Water chillers driven by electricity are used extensively in buildings, campuses, and district cooling plants to provide chilled water for comfort conditioning. In such applications, multiple chillers are generally arranged in parallel. Similarly, these systems may also utilize multiple, parallel pumps to circulate chilled or heated water and/or multiple, parallel connected fans to provide variable airflow for conditioning air in buildings.

Each chiller has an efficiency curve that may be plotted on a two-dimensional chart, where the vertical axis is British Thermal Units (BTU)/watt and the horizontal axis is fraction or percentage of full-located power. At the low end of the curves, the chiller is particularly inefficient because it is generating a relatively small amount of cooling. At the high end of the curve, various heat transfer efficiencies begin to decline as the heat exchangers reach a threshold output. In practice, each chiller may have a family of efficiency curves based on variables, which include, but are not limited to, condenser water input temperature and flow, chilled water output temperature setting, and chilled water input temperature.

SUMMARY

An embodiment is directed to a method for determining an efficiency curve of a chiller that includes operating a chiller over a range of operating capacities of the chiller, measuring a first temperature of water entering the chiller at an initial operating capacity within the range of operating capacities of the chiller, measuring a second temperature of water exiting the chiller at the initial capacity, measuring a first power consumption of the chiller at the initial capacity, calculating an initial efficiency value of the chiller at the initial capacity based on the first temperature, the second temperature, and the first power consumption, measuring a plurality of respective third temperatures of water entering the chiller at a plurality of operating capacities within the range of operating capacities of the chiller, where each operating capacity of the plurality of operating capacities is different from the initial operating capacity, measuring a plurality of respective fourth temperatures of water exiting the chiller at each operating capacity of the plurality of operating capacities, measuring a plurality of respective second power consumptions of the chiller at each operating capacity of the plurality of operating capacities, calculating a plurality of respective efficiency values of the chiller at each operating capacity of the plurality of operating capacities, where each respective efficiency value of the plurality of respective efficiency values is based on a respective third temperature of the plurality of respective third temperatures, a respective fourth temperature of the plurality of respective fourth temperatures, and a respective second power consumption of the plurality of respective second power consumptions, and generating an efficiency curve for the chiller with the initial efficiency value and the plurality of respective efficiency value.

An embodiment is directed to a method for generating an efficiency curve of a chiller that includes operating a chiller over a range of operating capacities of the chiller, measuring, at a first operating capacity within the range of operating capacities of the chiller, a first temperature of water entering the chiller using a first probe disposed in a water delivery conduit, measuring, at the first operating capacity, a second temperature of water exiting the chiller using a second probe disposed in a water discharge conduit, measuring, at the first operating capacity, a first power consumption of the chiller using a variable speed drive control, calculating a first efficiency value of the chiller at the first operating capacity based on the first temperature, the second temperature, and the first power consumption, measuring, at a second operating capacity within the range of operating capacities of the chiller, a third temperature of water entering the chiller using the first probe, measuring, at the second operating capacity, a fourth temperature of water exiting the chiller using the second probe, measuring, at the second operating capacity, a second power consumption of the chiller using the variable speed drive control, calculating a second efficiency value of the chiller at the second operating capacity based on the third temperature, the fourth temperature, and the second power consumption, and generating an efficiency curve for the chiller using the first efficiency value and the second efficiency value.

An embodiment is directed to a method of continuously determining efficiency of a chiller during operation of the chiller that includes measuring an input variable of the chiller, an output variable of the chiller, and an operating variable of the chiller at a first operating capacity of the chiller, calculating a first efficiency value of the chiller at the first operating capacity, measuring the input variable of the chiller, the output variable of the chiller, and the operating variable of the chiller at a plurality of second operating capacities of the chiller, calculating a plurality of second efficiency values of the chiller at each operating capacity of the plurality of second operating capacities of the chiller, and generating an efficiency curve of the chiller based on the first efficiency value and the plurality of second efficiency values.

Other features and advantages of the present disclosure will be apparent from the following more detailed description of the preferred embodiment, taken in conjunction with the accompanying drawings which illustrate, by way of example, the principles of the present disclosure.

DETAILED DESCRIPTION

Figure 1:
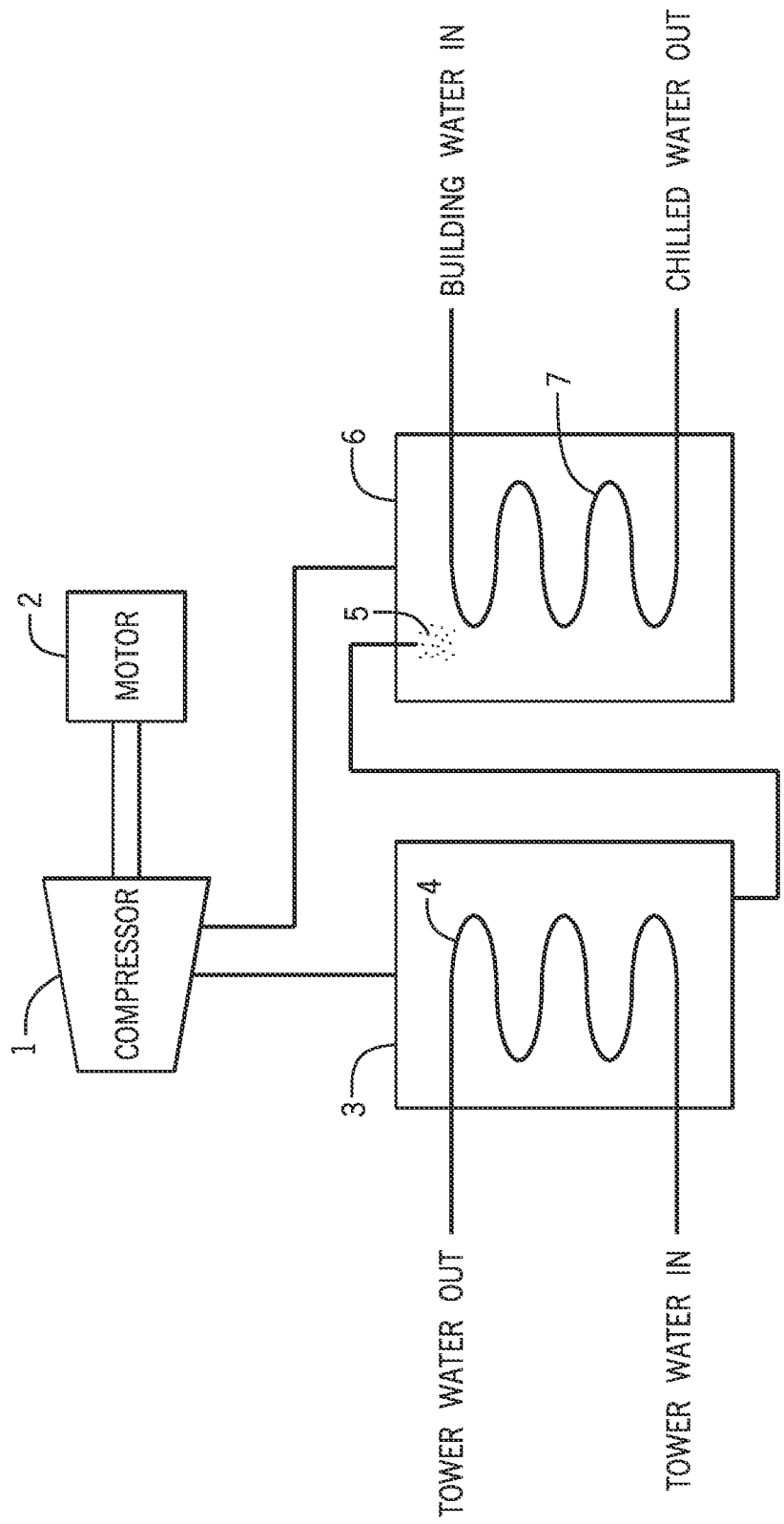
FIG. 1 is a diagrammatic view of an embodiment of a chiller for which the method of the present disclosure may be used, in accordance with an aspect of the present disclosure.

The description of illustrative embodiments according to principles of the present disclosure is intended to be read in connection with the accompanying drawings, which are to be considered part of the entire written description. In the description of embodiments of the present disclosure herein, any reference to direction or orientation is merely intended for convenience of description and is not intended in any way to limit the scope of the present disclosure. Relative terms such as "lower," "upper," "horizontal," "vertical," "above," "below," "up," "down," "top," and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar terms refer to a relationship wherein structures are secured or attached to one another either directly or indirectly through intervening structures, as well as both movable or rigid attachments or relationships, unless expressly described otherwise. Moreover, the features and benefits of the present disclosure are illustrated by reference to the preferred embodiments. Accordingly, the present disclosure expressly should not be limited to such preferred embodiments illustrating some possible non-limiting combination of features that may exist alone or in other combinations of features; the scope of the present disclosure being defined by the claims appended hereto.

An embodiment of an electric, water cooled chiller is shown diagrammatically in FIG. 1. In the illustrated embodiment of FIG. 1, the chiller includes a refrigerant compressed by a compressor 1, which is driven by an electric motor 2. The compressed refrigerant is directed into a condenser 3, where heat is absorbed by a heat exchange coil 4 (e.g., a first heat exchange coil) using water from a cooling tower (not shown). The cooled compressed refrigerant becomes a liquid which is sprayed thru a nozzle 5 in an evaporator 6. The refrigerant from the nozzle expands into a cold gas. A heat exchange coil 7 (e.g., a second heat exchange coil) transfers heat from water 8 circulating through a building to produce chilled water 9 for cooling the building. Chillers are sold in various sizes, where the size usually correlates to chilling capacity. The efficiency of a chiller (measured in amount of cooling achieved per amount of electric power consumed) is a prime consideration since the power consumed by a chiller may be substantial.

Figure 2:
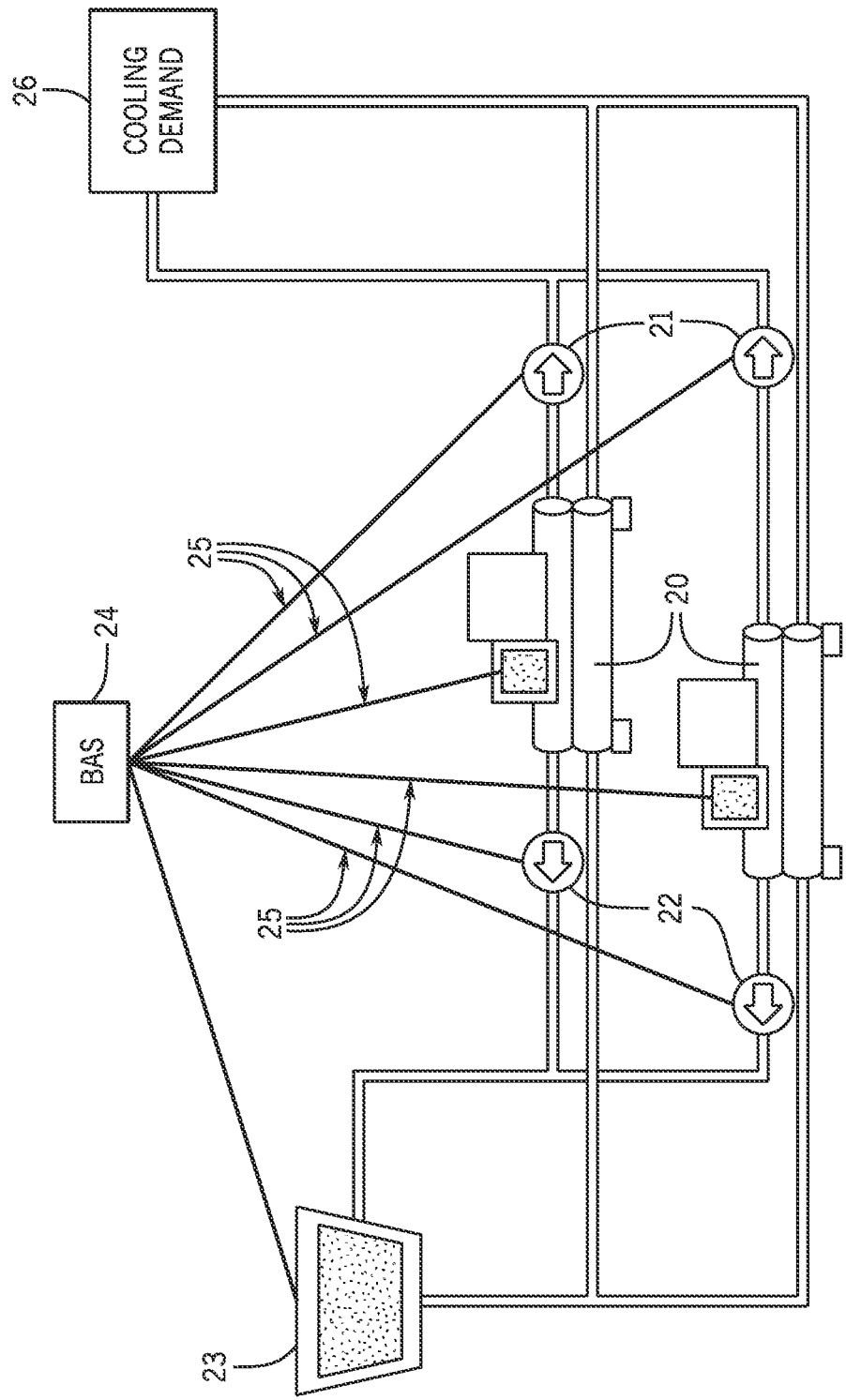
FIG. 2 is a diagrammatic view of an embodiment of multiple chillers in a cooling plant, in accordance with an aspect of the present disclosure.

As discussed above, a single chiller may not be sufficient to satisfy a relatively large cooling demand. A building automation system 24 may be included in a system to provide operational control and coordination of multiple chillers 3, pumps 21 and/or 22, cooling towers 23, and other equipment. For example, FIG. 2 illustrates diagrammatically a typical multi-chiller cooling plant controlled by the building automation system 24. In the illustrated embodiment of FIG. 2, the chillers 20, the chilled water pumps 21, the cooling tower pumps 22, and the cooling tower 23 are controlled by electrical connections 25 to the building automation system 24. Typically, the chilled water pumps 21 would be variable speed pumps to enable the building automation system 24 to divide a total amount of chilled water delivered to a load 26 between the multiple chillers 20.

When the cooling demand is less than a total capacity of all the chillers 20 combined, the building automation system 24 chooses which chillers 20 to run and at what capacity. There are several heuristics or algorithms that the building automation system 24 may use to determine which chillers 20 to run and when. These algorithms include, but are not limited to, a predetermined sequence to reach a load, such as designating respective chillers 20 as primary and secondary units, a leveling sequence to alternate running between respective chillers 20, and hybrids of the two. A feature of the building automation system 24 is the ability to operate the chillers 20 upon command to minimize total consumption of electricity for a given cooling load.

Chillers inherently vary in efficiency because of differences in design (e.g., low friction bearings, evaporator and condenser surface areas, and/or tubes with contoured surfaces to facilitate heat transfer). In addition, efficiency varies depending upon the type of compressor included in the chiller. For example, variable speed compressors generally maintain high motor efficiency across a wide range of loads, while dual compressors offer the option of shutting one compressor off during low loads.

Chillers tend to lose efficiency at relatively low loads because the designed capacity of the chiller is simply much greater in comparison to the low load demand. Most chillers also tend to lose efficiency at high loads, where heat transfer resistances of the evaporator 6 and the condenser 3 become increasingly significant obstacles. If the efficiency of each chiller 20 at various loads is known to the building automation system 24, the building automation system 24 may use this information to select a combination of chillers 20 and chiller loads to minimize energy consumption.

If the building automation system 24 can determine the efficiency of a chiller 20 across its load range, greater efficiencies can be achieved at a chiller plant. For example, if a chiller 20 is known to be most efficient in the 30-60% load range, the building automation system 24 (or similar system) may generate and employ strategies that enable two such chillers 20 to run most often within this efficiency range. In other words, a system with two identical chillers 20 is most efficiently operated with both chillers 20 running at 50%, rather than one chiller 20 operating at 100%. A chiller's efficiency across a range of loads is the chiller's efficiency curve. Both heterogeneous chillers 20 (e.g., different types of chillers 20) and homogenous chillers 20 (e.g., the same type of chiller 20) may have different efficiency curves based on a chiller's age, current state of operation, and even the system's topology.

In a multi-chiller cooling plant, the building automation system's 24 objective may be to orchestrate chiller 20 operation by prioritizing the scheduling of all chillers 20 in the system to meet the cooling demand by operating at their highest efficiency. Such organization of chiller 20 operation may include a large amount of information that may be input and/or stored in the building automation system 24. Efficiency parameters may be provided as constants programmed into the building automation system 24 during installation. Most often, such parameters are simply estimates or guesses by the installer. Some such information may be derived from a data sheet for a respective chiller 20. However, chiller 20 manufacturers are incentivized to supply only a small amount of best-case information in data sheets, and thus the building automation system 24 is left making decisions based on poor or non-existent data.

Embodiments of the present disclosure provide for the chiller 20 itself to accumulate actual performance data based upon operation and to provide derived efficiency information to the building automation system 24. Such information is dramatically more accurate than data sheet estimates or guesses, and leads to the opportunity to substantially improve energy optimization. The efficiency of a chiller 20 can be expressed as an efficiency curve 64 that may be represented graphically on a two-dimensional chart. The vertical axis may be in units of British Thermal Units (BTU)/watt and the horizontal axis is a fraction, or percentage, of full-load power. Referring to the efficiency curve shown in FIG. 3, at the low end, the chiller 20 is particularly inefficient because it is delivering a relatively small amount of cooling in comparison to the chiller's total capacity. Similarly, at the high end, various heat transfer efficiencies begin to decline as the heat exchangers reach maximum output, thereby reducing an efficiency of the chiller 20.

In practice there is a family of efficiency curves 64 for each chiller 20. The curves vary due to changes in certain operating parameters, which include, but are not limited to: condenser water input temperature and flow, chilled water output temperature setting, and/or chilled water input temperature. The use of BTU per watt as an efficiency measure tends to reduce the need for input and output chilled water temperatures as parameters of the curve. Typically, efficiency curves for a particular chiller 20 may be determined from the chiller 20 design (software can estimate efficiency curves) or from testing chillers 20 in a facility that can take measurements during chiller 20 operation to produce the efficiency curve 64. However, these sources can add additional cost and are not applicable to older chillers 20 where the design information is not available and testing was not performed.

Therefore, in order for the building automation system 24 to provide optimal performance of the chillers 20, the building automation system 24 may obtain accurate efficiency data from each of the chillers 20. The building automation system 24 may utilize the efficiency data in order to more accurately decide a combination of towers, pumps, and chillers 20 that should be running at any given time to most efficiently meet building load demand. The building automation system 24 may obtain these data points in the same manner as it receives other chiller 20 data. For example, the chiller 20 data may be updated and stored in a points list that is exposed over the chiller's communications link to the building automation system 24. In some embodiments, the communications link is an RS-485 port. In other embodiments, the communications link may be an Ethernet, a fiber optic, or a wireless connection. The data will be transferred using a specified supported protocol such as, but not limited to, Modbus, N2 or BACnet (ANSI/ASHRAE 135-2008, ISO 16484-5).

Figure 4:
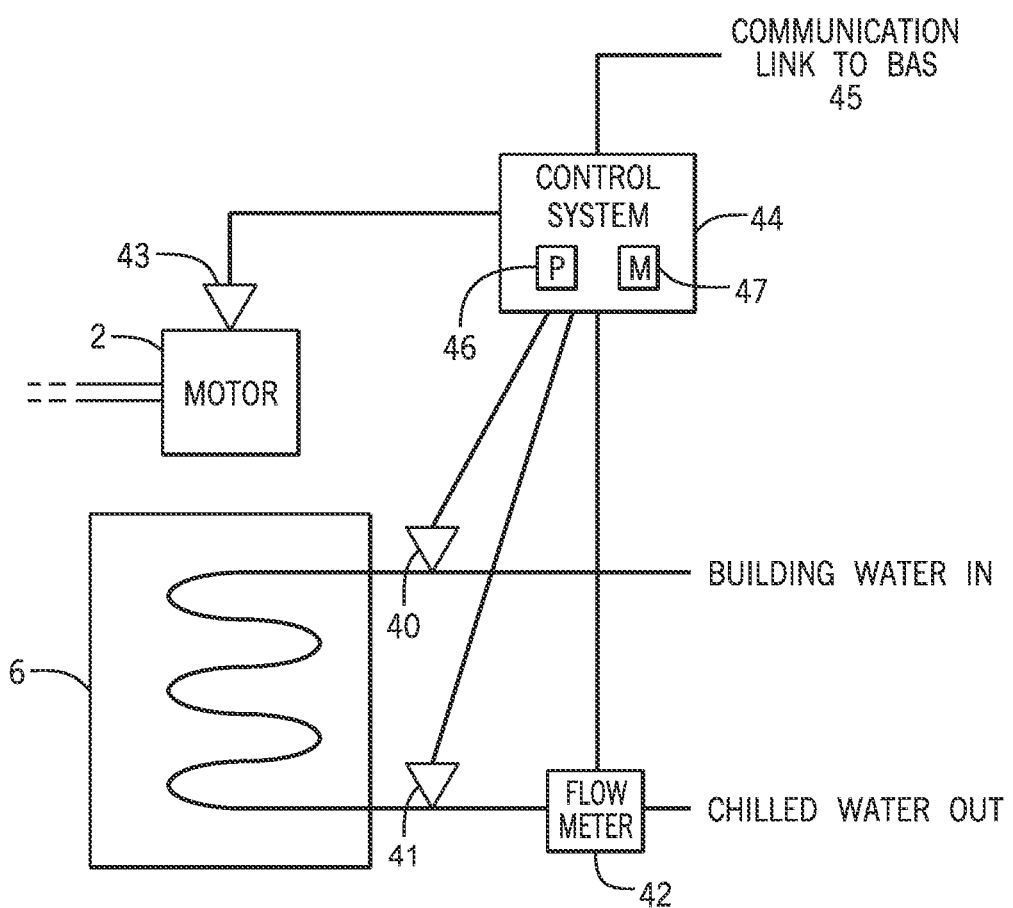
FIG. 4 is a diagrammatic view of an embodiment of a control system for a chiller, in accordance with an aspect of the present disclosure.

As described below, the efficiency curve 64 for a chiller 20 is determined by the chiller 20 itself by measuring efficiencies as it operates under a variety of load demands. As illustrated in FIG. 4, a temperature sensor 40 may be used to read a temperature of incoming building water in the evaporator 6 of a chiller 20. Another temperature sensor 41 may be used to read a temperature of outgoing chilled water. A flow meter 42 is disposed into a flow of chilled water to determine an amount of chilled water being produced. A power measurement apparatus 43 may be utilized to determine an amount of power being consumed by the motor 2. In some embodiments, the motor 2 includes an electronic motor control system, so the power measurement may be available from the electronic motor control system.

The data measurements from the above sensors may be routed to a control system 44 (e.g., a computing system with a processor and/or memory circuitry) that performs a learning function. The learning function may include: sampling sensor data and computing operating efficiency; storing such efficiency measurements for purposes of learning the chiller 20 operating characteristics; reducing the acquired data to estimate efficiency at specified operating points; and communicating such efficiency estimates as requested by the building automation system 24.

In some embodiments, the control system 44 includes a processor 46 and memory 47. More specifically, the processor 46 may include one or more application specific integrated circuits (ASICs), one or more field programmable gate arrays (FPGAs), one or more general purpose processors, or any combination thereof. Additionally, the memory 47 may include volatile memory, such as random access memory (RAM), and/or non-volatile memory, such as read-only memory (ROM), optical drives, hard disc drives, or solid-state drives.

Figure 5:
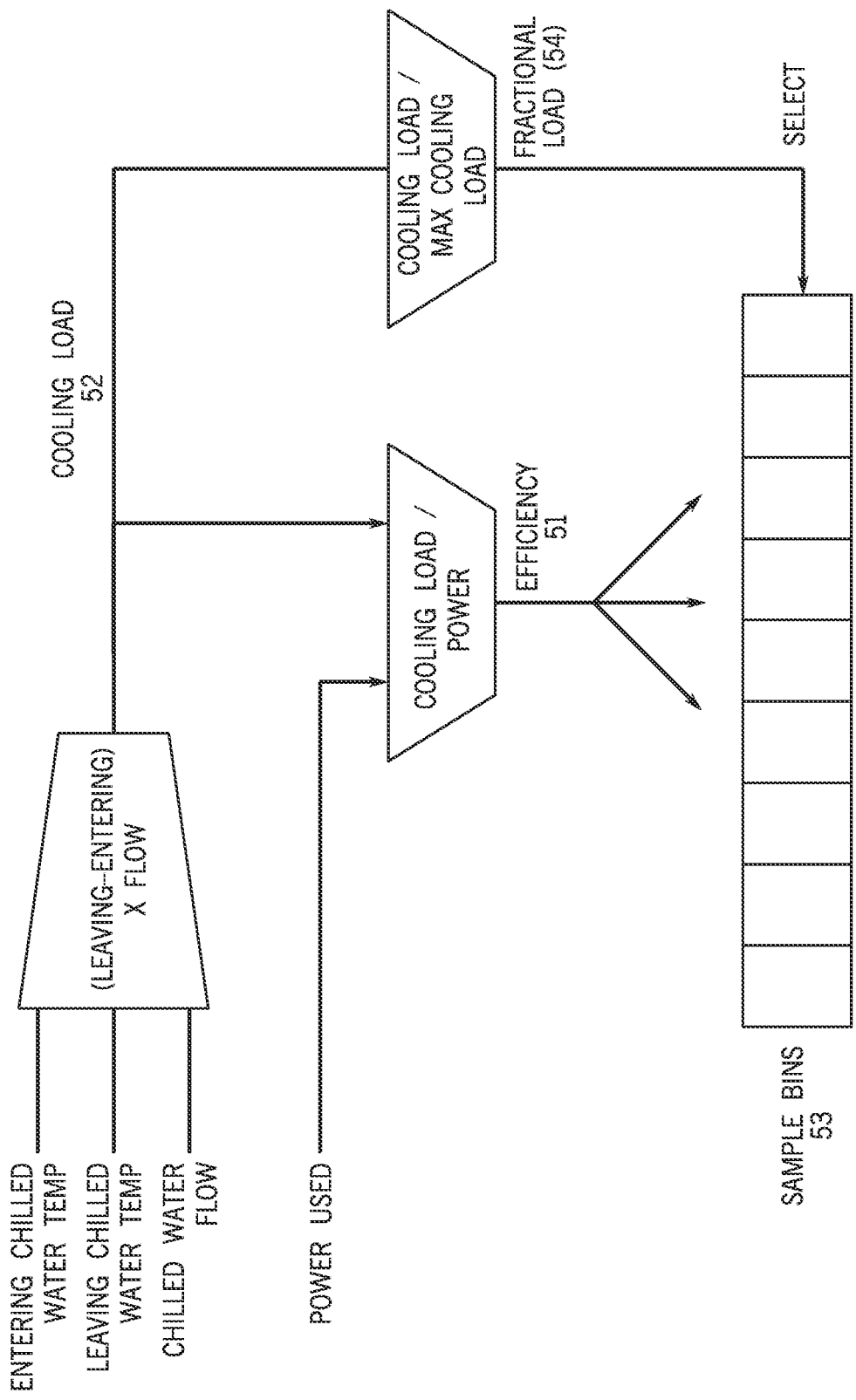
FIG. 5 is a schematic of an embodiment of a method for generating an efficiency curve for a chiller using binning, in accordance with an aspect of the present disclosure.

FIG. 5 illustrates how the control system 44 may utilize the sensor inputs to produce efficiency sample measurements 51. A single point on the efficiency curve 64 calculated by Equation 1:

$$Eff = \frac{((\text{leaving cooling water Temp}) - (\text{entering cooling water Temp})) * \text{flow}}{(\text{motor power consumption})} * CC \quad (1)$$

Where:
CC is a constant used to convert to the desired output units (BTU/Watt for example).

The calculation above can be split apart because the intermediate result (e.g., cooling load 52) is used both for efficiency estimates and for sample binning. Efficiency measurements (e.g., determined from sensor feedback) at a specific operating point are available continuously while the chiller is operating, but for curve estimation purposes a limited number of efficiency measurements may be desired. Accordingly, a process called binning may be utilized. For example, the operating range (i.e., 0 to 100%) is divided into a number of bins 53 (e.g., 20 bins that each represent 5% of the operating range) that represent a portion of the operating range. Each bin 53 contains measurements for a corresponding portion of the operating range. The chiller will add a sample to a bin when the fractional load 54 enters a range corresponding to the particular bin 53. The number of samples in each bin may be limited to a fixed number of samples (e.g., 10 samples). If the bin is full when a sample is added, one of the existing samples may be discarded. Some methods for discarding existing samples include oldest sample, and random sample selection, which are described in detail below.

Some amount of hysteresis is desirable in the sample collection process to account for the fact that a chiller 20 might be operating on an edge of a bin 53 boundary (as reflected by the fractional load calculation 54), such that the measured operating point may fluctuate back and forth over the boundary between adjacent bins 53. One applicable technique delays storing a new sample until the calculated fractional load 54 moves by one bin 53 width to prevent such movement.

Because chillers that provide chilled water for comfort conditioning or process cooling are normally subject to relatively wide variations in cooling loads, the ability to adjust capacity of individual chillers 60 along with a method of sequencing chillers 60 or compressors on and off line is employed to accommodate load changes and achieve efficient plant 62 operation. As discussed above, control of the number of chillers 60 or compressors on line is dynamically accomplished by control algorithms, in which sequencing is based on the efficiency curves of the chillers 60 or compressors. Previously, chiller efficiency curves were based on estimates or testing. However, the efficiency curve 64 (FIG. 3) for a chiller 60, using the method and system described herein, is determined by measuring efficiencies as the chiller 60 is operating.

In order to determine the efficiency curve 64, the chiller's 60 operation is initiated and data is collected and revised as described herein. Each point on the efficiency curve 64 may be calculated using the Equation 1, set forth above.

Figure 6:
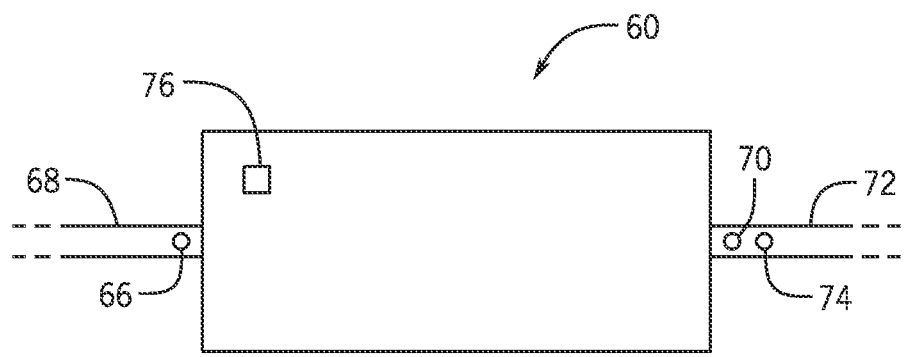
FIG. 6 is a schematic of an embodiment of a chiller having sensors for generating an efficiency curve of the chiller, in accordance with an aspect of the present disclosure.
Figure 7:
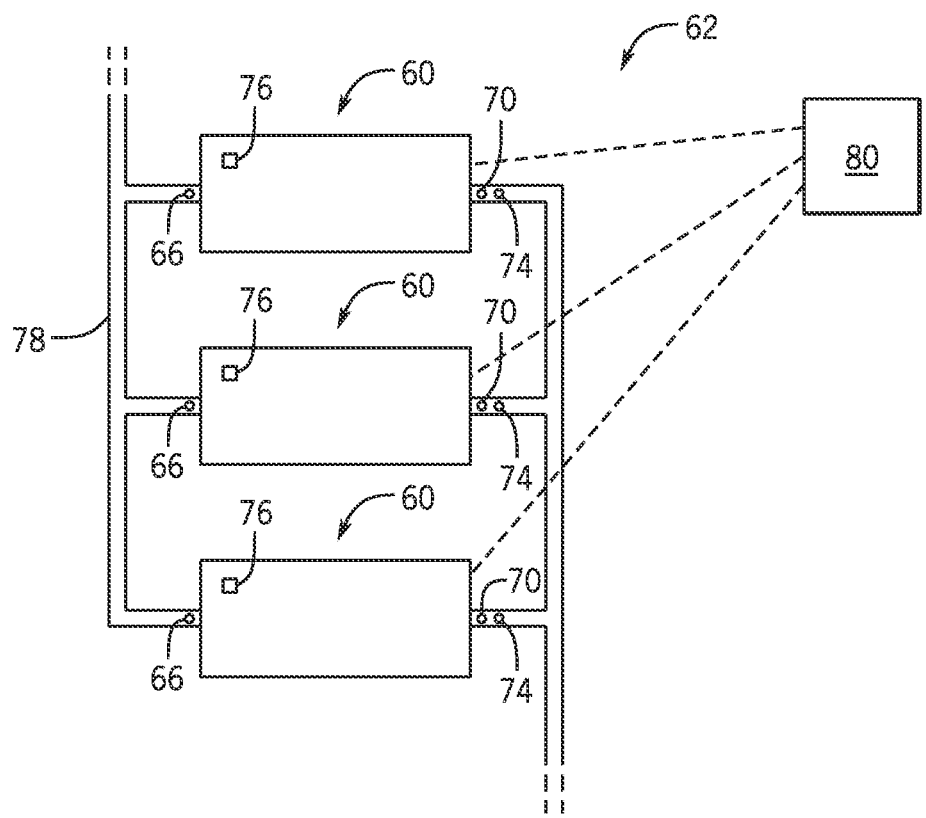
FIG. 7 is a schematic of an embodiment of a plurality of chillers having sensors for generating efficiency curves for each of the plurality of chillers, in accordance with an aspect of the present disclosure.

FIGS. 6 and 7 are schematics of embodiments of a chiller 60, or a plurality of chillers 60, whose efficiency curve 64 may be determined using embodiments of the present disclosure. As shown in the illustrated embodiments of FIGS. 6 and 7, a temperature of cooling water entering the chiller 60 is measured by one or more probes or sensors 66 in one or more water delivery conduits 68. Similarly, a temperature of cooling water leaving the chiller 60 is measured by one or more probes or sensors 70 in one or more discharge conduits 72. Additionally, a flow of the cooling water is measured by one or more flow meters 74, which may be disposed in the one or more discharge conduits 72. Alternatively, the one or more flow meters 74 may be located in other positions within the chiller 60, such as, but not limited to the one or more water delivery conduits 68. Further still, a power consumption of the motor 2 of a respective chiller 60 may be measured by a variable-speed drive control 76 of the respective chiller 60.

Figure 8:
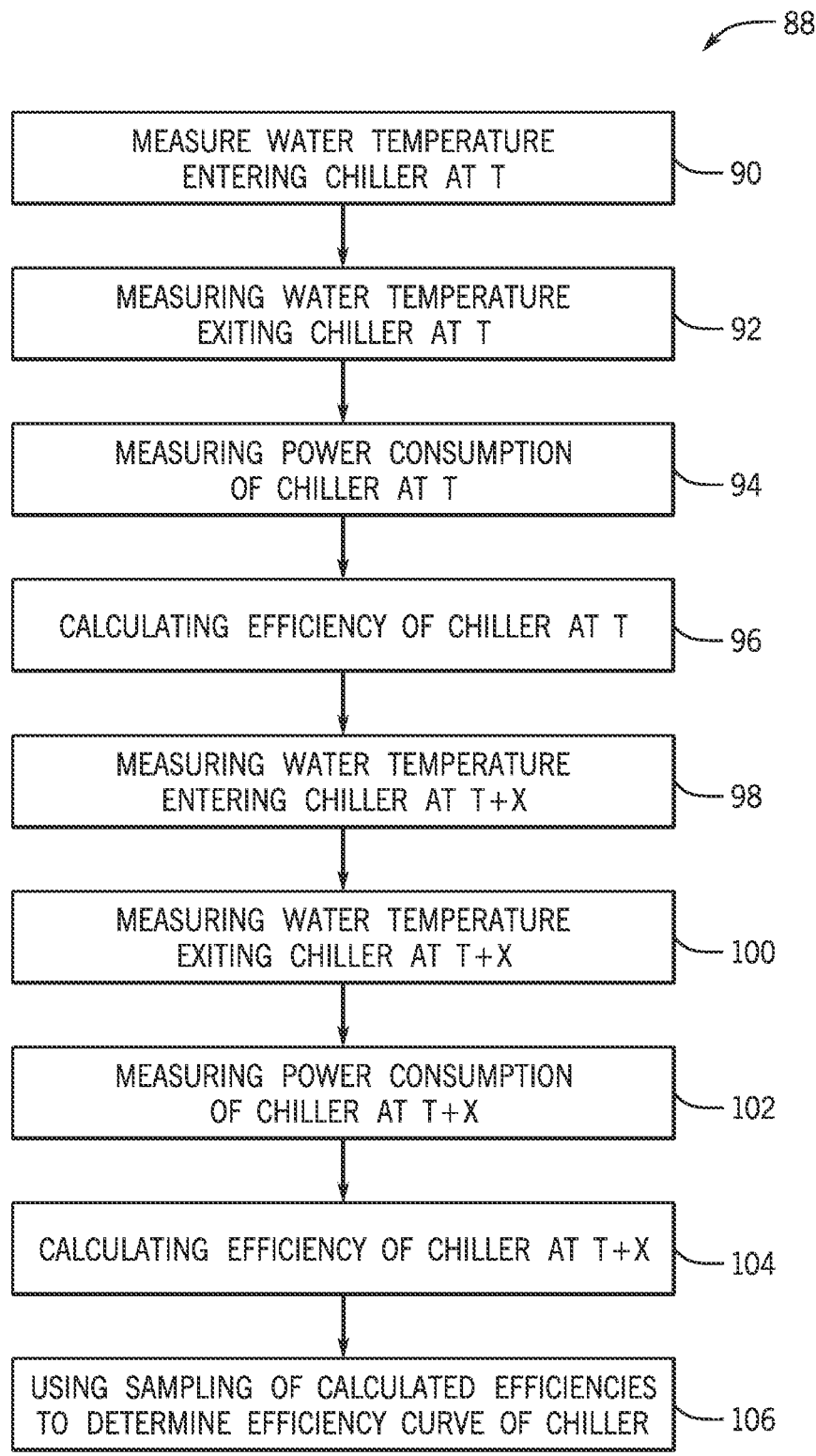
FIG. 8 is a block diagram of an embodiment of a method for generating an efficiency curve of a chiller, in accordance with an aspect of the present disclosure.

In general, a method 88 of determining the efficiency curve for a chiller 10 and/or 60 during operation of the chiller 10 and/or 60 is shown in FIG. 8. For example, at block 90, the temperature of water entering the chiller 60 at an initial time is measured. Similarly, at block 92, the temperature of water exiting the chiller 60 at the initial time is measured. At block 94, the power consumption of the chiller 60 at the initial time is also measured. Utilizing the temperature of water entering the chiller 60, the temperature of water exiting the chiller 60, and the power consumption of the chiller 6, the efficiency of the chiller 60 at the initial time may be calculated, as shown at block 96. Additionally, at block 98, the temperature of water entering the chiller 60 is measured at the one or more subsequent times (e.g., times after the initial time). The temperature of water exiting the chiller 60 is also measured at the one or more subsequent times, as shown at block 100. Further still, the power consumption of the chiller 60 is measured at the one or more subsequent times at block 102. As such, the efficiency of the chiller 60 at the one or more subsequent times may be determined using a respective temperature of water entering the chiller 60, a respective temperature of water exiting the chiller 60, and a respective power consumption of the chiller 60 at the subsequent times, as shown at block 104. Accordingly, at block 106, the calculated efficiency at the initial time and the calculated efficiencies at the one or more subsequent times are used to generate an efficiency curve for the chiller 60.

Understanding the actual efficiency curve of a chiller 10 and/or 60 provides meaningful and accurate information as compared to a predetermined estimated efficiency curve. As the efficiency of the chiller 60 changes (e.g., as the chiller 60 ages or is used), the actual efficiency curve that is generated as the chiller 60 operates, enhances an accuracy of determining chiller efficiency, thereby increasing an energy efficiency of a cooling plant 62.

Efficiency measurements at a current operating point may be calculated continuously based on measurements taken while the chiller 60 is operating. However, for curve estimation purposes, a limited number of samples or data points may be utilized. In order to provide an appropriate number of data points, a process known as binning is used. In binning, the operating range (i.e., 0% to 100%) of the chiller 60 is divided into a number of segments or bins 53. In the illustrative embodiment shown in FIG. 5, twenty bins may be utilized, with each bin 53 representing 5% of the operating range. However, in other embodiments, different number of bins 53 may be used, with each bin 53 representing a different percentage range of operating range of the chiller 60. Each bin 53 contains measurements from a portion of the operating range to which the bin 53 corresponds. For example, a bin 53 that represents from 20% to 25% of the operating range will receive samples that are collected when the chiller 60 operates from 20% to 25% of the total capacity of the chiller 60. In other words, the chiller 60 adds a sample to a respective bin 53 when the chiller 60 enters the corresponding operating range of that bin 53. Although the number of samples housed in a bin 53 may by unlimited, the number of samples in each bin 53 is generally limited to a fixed number (e.g., ten). If the respective bin 53 is full (e.g., includes an amount of samples equal to the fixed number), one of the existing samples may be discarded when the chiller 60 attempts to add another sample, thereby enabling the chiller 60 to maintain an appropriate number of samples for that bin 53. The existing samples may be discarded using various methods, such as, but not limited to, discarding the oldest first or discarding a random sample.

For example, discarding the oldest sample first may provide a more accurate representation of the current operation of the chiller 60. The oldest sample method may enable the current efficiency curve to be compared to a stored efficiency curve, which represents the original operation and efficiency of the chiller 60. A comparison of the current efficiency curve to the stored efficiency curve provides the operator a tool to determine whether the chiller 60 should undergo maintenance. As another example, the random discard of samples method avoids bias in the sampling process, which may provide a more accurate representation of the efficiency curve over various conditions or seasons. The random discard of samples method may enable a controller 80, which operates the cooling plant 62, to better determine whether a particular chiller 60 should be utilized when the system is operating under a partial loading of all the chillers 60.

In some cases, a chiller 60 may operate on an edge of a bin 53 boundary, thereby increasing a risk that the measured operating point may fluctuate back and forth over the boundary. Fluctuations of the measured operating point over the boundary may potentially cause one or more samples to be collected when the operating point of the chiller 60 has not changed significantly, thereby creating duplicate samples. In order to diminish redundant sampling, some amount of hysteresis is desirable in the sample collection process. For example, one illustrative technique to prevent redundant samples from being collected is to delay the storing of a new sample until the operating point of the chiller 10 moves by one entire bin 53 width.

Figure 3:
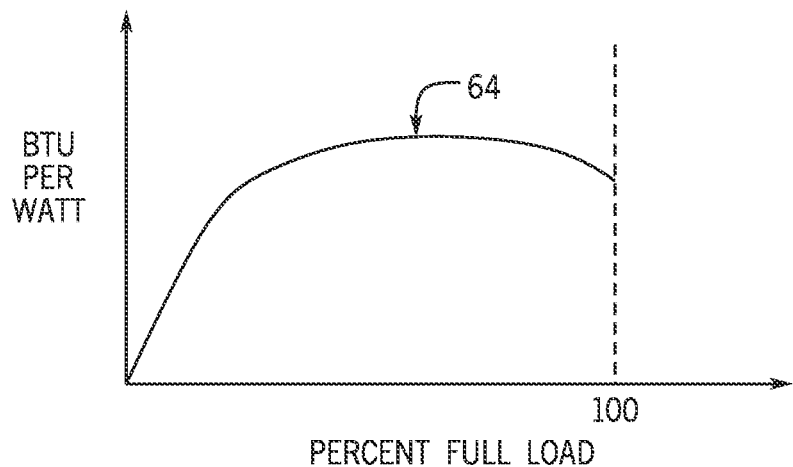
FIG. 3 is a graphical illustration of an embodiment of an efficiency curve of a chiller, in accordance with an aspect of the present disclosure.

In order to provide the efficiency of the chiller 10 at any point in its operating range, the collected sample data may be interpolated to provide a continuous operating curve 64 (FIG. 3). One such method of interpolation uses a polynomial, least squares method using available samples or data points housed in the bins 53. In one illustrative embodiment, the 2nd degree polynomial shown in Equation 2 is used:

$$Eff_{est} = C0 + C1*X + C2*X^2 \qquad (2)$$

Where:
X is the desired operating point, and
C0, C1, and C2 are coefficients computed by the least squares method from the binned data.

In other embodiments, other degrees of polynomials may be used. For example, a $3^{rd}$ degree polynomial has the advantage of being able to represent a flattened parabola curve plausibly well while reducing complexity of the computation. However, in general, a $2^{nd}$ degree polynomial tends to result in a more stable fit for most efficiency curves.

Spline interpolation may also be used to provide a more accurate efficiency curve. Chillers 60 generally exhibit a fast rise (see e.g., FIG. 3) from 0 at the low end of the efficiency curve 64. This property is due to the fact that a large chiller 60 is particularly inefficient at producing relatively small amounts of cooling. The knowledge of this property can be exploited by picking a division point (e.g., 15%) and using two different curve interpolations to estimate the curve on either side of the division point (e.g., one interpolation for the curve profile below the division point and one interpolation for the curve profile at and above the division point).

Alternatively, an average of the samples in each bin 53 is computed, resulting in one efficiency estimate per bin 53. This method is simple and convenient if the chiller 60 is reporting efficiency to the building automation system 24 as a discrete table with the same number of points as bins 53. It does however fail to smooth variations between bins 53. Other similar methods (such as average of the bin 53 and two adjacent bins 53) can be envisioned as simpler than the least squares embodiment.

While the method described above provides an accurate estimation of the efficiency curve 64 of the chiller 60, sufficient samples or data points may not be available during startup of a new cooling plant 62 or chiller 60. For example, at startup there are insufficient samples or data points particularly at extremes of the operating range to produce a reliable and accurate approximation of the true efficiency curve 64. In addition, sufficient sample or data points may not be available when a query for operating efficiency occurs at an operating point that exceeds the highest operating point sampled up until that point in time. This situation can also occur for requests for relatively low operating points. In these circumstances, the least squares method may not produce a reasonable representation of the extrapolated high or low operating point. Therefore, it may be advantageous to preload the bins with samples or data points. Such preloaded samples or data points may be calculated using a curve from a similar chiller 60, or may be calculated using various methods, such as, but not limited to, computing the samples or data points from a very simple model of chiller 60 efficiency. One such illustrative model is illustrated in Table 1:

TABLE 1

Model for computing samples or data points

| Operating Range (Bin) | Initialization Value |
| --- | --- |
| 0 | 0 |
| Above 10% | (Rated Capacity * 0.9)/Job Full Load Power |
| >0, <10% | Linear between the above entries |

Such models enable initial samples or data points to be calculated from information which is determined and communicated by the manufacturer of the chiller 60, for example. The effect of preloading bins 53 with these values enables the least squares method approximation to utilize the estimates to more quickly produce a curve that reasonably accounts for the expected capacity and extremes as the chiller 10 operates. The preload values may be tagged as such, so that the first real sample added to the bin replaces the preload value. This approach can speed convergence to a fully sampled efficiency curve.

In the alternative, the chiller 60 may be run through a training cycle. The training cycle may improve the quality of estimates at the startup of a new chiller. Such a training cycle starts the chiller 60 at low output and slowly scales the output up to maximum capacity. While the chiller 60 is performing the training cycle, samples or data points are collected as previously described. The calculated efficiencies are determined, thereby producing a realistic sampling of the chiller's efficiency across all of the bins 53 and across the full range of operation.

In various applications it is beneficial to have the efficiency curve parameterized by a temperature of water entering the condenser 3 of the chiller 60. Such applications, include, but are not limited to, when the temperature of the input water varies according to the weather conditions, ambient environment, or seasons in the surrounding area in which the chiller 60 is located. In one illustrative embodiment, Equation 3 may be used to calculate efficiency:

$$Eff = (Max\ Cond.Temp - Cond.Water\ In\ Temp)$$
$$*C*Operating\ Efficiency(Operating\ Point) \qquad (3)$$

Where:
Max Cond. Temp is the maximum temperature of the condenser;
Cond. Water In Temp is the temperature of water incoming from the cooling tower;
Operating Efficiency is the efficiency as a function of operating point;
Operating point is the current power input ranging from 0% to 100%; and C is a constant to convert temperature units to a fractional representation.

Equation 3 is a non-linear model and is not directly amenable to the usual least-squares approximation. However, there are non-linear iterative approximation methods (for example the Gauss-Newton method) that may be used to find a least squares fit for such an approximation. Iterative methods usually require a starting guess to improve upon, and such a guess may be obtained from a least-squares fit as described below.

Regardless of whether a linear or non-linear method is utilized, to control the number and quality of samples collected, the binning approach described above is expanded to be two-dimensional. Bins are added in the temperature direction to hold samples for various temperatures (for example, every 5 to 10 degrees) at a given operating point. In practice, only a few bins may be utilized since temperature fluctuations are generally not significant.

The spline method described above may be used to simplify the regression process. For example, the operating range is divided into two splines. In some embodiments, Equation 4 may be used to represent the spline representing higher load operation:

$$\text{Eff}_{est} = C0 + C1 \ast X + C2 \ast X^2 + C3 \ast T \qquad (4)$$

Where:
X is the desired operating point between 0% and 100%; and
T is the condenser water in temperature.

Because this approximation is linear, the ordinary least squares method may be used to compute the best-fit coefficients.

The spline method assumes that the temperature contribution is additive, which reduces an accuracy of the spline method. However, since the efficiency curve is relatively stable in magnitude across the upper operating range, the approximation is sufficient. Generally, the low operating range of the curve does not include the temperature parameter because the assumption of linearity in temperature would further reduce an accuracy of the method.

In some embodiments, a query interface is provided to enable a control system to determine an efficiency of the chiller 60 at a particular operating point. Users of this interface are typically, but not limited to, building automation systems 24. Upon request for an efficiency estimate at a particular operating point, the approximation curve derived above (non-linear, spline, or least squares) is evaluated and the estimated efficiency returned. Optionally, the request may be interpreted as a cue to re-compute the approximation curve from more recent samples. In some embodiments, re-computing is performed when additional samples have been added. There are various methods of representing the efficiency data requested by the building automation system 24. As an example, a table of N points may be generated. The table specifies an expected operating efficiency of the chiller 60 at loads of 100/N % to 100% in steps of 100/N %. The quantity N may be fixed, or it may be specifiable by the building automation system 24. Alternatively, the building automation system 24 may specify a load, and the chiller 60 responds with the estimated efficiency at that load.

Another illustrative method would be to expose a predetermined number of points (e.g., 1, 2, 3, 4, 5, 6, 7, 8, 9, 10, or more) to the building automation system 24. In some embodiments, four points may be exposed to the building automation system 24: a first bin point, a first inflection point, a second inflection point, and the last bin value. The building automation system 24 could then see the efficiency at extreme low and high ends, when the efficiency has started to increase, and/or the last point before the efficiency starts to drop. In other embodiments, the chiller could expose two points indicating the maximum efficiency range (sweet spot) of the chiller efficiency range. Utilizing two points may enable the building automation system 24 to know a range at which the chiller may be run at maximum or near maximum efficiency. To compute such a range, some delta efficiency below maximum may be specified, which could be a fixed value or a value specified by the building automation system 24.

The system and method of determining efficiency of the chiller 60, or the learning system and method described above, provide an approximate efficiency estimate at any time during the installation and life cycle of the chiller 60, including initial startup. The estimated efficiency may be provided to a controller provided in a building automation system 24 or another suitable computing device. In some embodiments, the quality of the estimate improves with additional operation time and variations of operating parameters. The efficiency curve for the chiller 60 is determined by the chiller 60 itself by measuring efficiencies as it operates. This system and method may be used for new chillers 60, for chillers 60 which have been operating for a prolonged period of time, and/or for chillers 60 that do not have such efficiency information readily available (e.g., the chiller 60 was not manufactured during the chiller's design or factory testing). Accordingly, the systems and methods described in the present disclosure provide accurate load versus efficiency information.

The efficiency curves for the chillers 60 in a building can be used by the building automation system 24 or similar computer management system to perform continuous analysis of the building cooling loads as well as to determine which chillers 60 should be running. Such determinations may enable electric power consumption at the imposed cooling load level to be reduced. The building automation system 24 may also use this information to schedule multiple chiller 60 operation to further reduce power consumption for a given amount of cooling demand. The efficiency information remains accurate over the lifespan of the system. Therefore, variables not explicitly accounted for (e.g., ambient temperature, fouling of the heat exchangers, lubrication, etc.) may be accounted for in the building automation system decision making.

The efficiency curves also enable the operator or the building automation system 24 to determine if one or more of the chillers should incur maintenance. If the efficiency of a respective chiller 60, as determined by a comparison of the efficiency curves over time, is reduced, maintenance may be scheduled for that respective chillers 60. In addition, if the efficiency curve of one chiller 60 in a cooling plant is significantly different from the efficiency curves of other chillers 60, the chiller 60 which has the different efficiency curve may undergo or maintenance.

While the present disclosure has been described with reference to a preferred embodiment, it will be understood by those skilled in the art that various changes may be made and equivalents may be substituted for elements thereof without departing from the spirit and scope of the present disclosure as defined in the accompanying claims. In particular, it will be clear to those skilled in the art that the present disclosure may be embodied in other specific forms, structures, arrangements, proportions, sizes, and with other elements, materials, and components, without departing from the spirit or essential characteristics thereof. One skilled in the art will appreciate that the present disclosure may be used with many modifications of structure, arrangement, proportions, sizes, materials, and components and otherwise, used in the practice of the present disclosure, which are particularly adapted to specific environments and operative requirements without departing from the principles of the present disclosure. The presently disclosed embodiments are therefore to be considered in all respects as illustrative and not restrictive, the scope of the present disclosure being defined by the appended claims, and not limited to the foregoing description or embodiments.

The invention claimed is:

1. A control system for determining an efficiency curve of a chiller, comprising:
   a processor; and
   a memory storing instructions that, when executed by the processor, cause the processor to:
      operate the chiller over a range of operating capacities of the chiller;
      calculate a first efficiency value of the chiller at a first operating capacity of the chiller;
      calculate a plurality of second efficiency values of the chiller at each second operating capacity of a plurality of second operating capacities of the chiller;
      separate samples comprising the first efficiency value and each respective second efficiency value of the plurality of second efficiency values into a plurality of bins, wherein each bin of the plurality of bins represents a portion of the range of operating capacities of the chiller; and
      generate the efficiency curve for the chiller based on the samples in the plurality of bins.

2. The control system of claim 1, wherein the instructions, when executed by the processor, cause the processor to preload one or more bins of the plurality of bins with predetermined samples based on a training cycle of the chiller.

3. The control system of claim 1, wherein the instructions, when executed by the processor, cause the processor to preload one or more bins of the plurality of bins with predetermined samples based on one or more efficiency curves from an additional chiller, a chiller efficiency model, or both.

4. The control system of claim 1, wherein the instructions, when executed by the processor, cause the processor to discard an existing sample in a first bin of the plurality of bins when a new sample is separated into the first bin, and wherein the existing sample is randomly selected from a plurality of existing samples in the first bin.

5. The control system of claim 1, wherein the instructions, when executed by the processor, cause the processor to discard an existing sample in a first bin of the plurality of bins when a new sample is separated into the first bin, and wherein the existing sample is an oldest sample in the first bin.

6. The control system of claim 1, wherein the instructions, when executed by the processor, cause the processor to:
   separate a first sample into a first bin of the plurality of bins; and
   delay separation of a second sample into a second bin of the plurality of bins until when a current operating capacity of the chiller changes by an amount equal to the portion of the range of operating capacities corresponding to the first bin to prevent redundant samples from being collected.

7. The control system of claim 1, wherein the instructions, when executed by the processor, cause the processor to calculate the first efficiency value of the chiller at the first operating capacity based on a first temperature of water entering the chiller at the first operating capacity, a second temperature of water exiting the chiller at the first operating capacity, and a first power consumption of the chiller at the first operating capacity.

8. The control system of claim 1, wherein the instructions, when executed by the processor, cause the processor to calculate the plurality of second efficiency values of the chiller at each second operating capacity of the plurality of second operating capacities based on a respective third temperature of a plurality of third temperatures of water entering the chiller at each second operating capacity of the plurality of second operating capacities, a respective fourth temperature of a plurality of fourth temperatures of water exiting the chiller at each second operating capacity of the plurality of second operating capacities, and a respective second power consumption of a plurality of second power consumptions of the chiller at each second operating capacity of the plurality of second operating capacities.

9. The control system of claim 1, wherein the instructions, when executed by the processor, cause the processor to communicate the efficiency curve to a building automation system configured to control the chiller based on the efficiency curve.

10. A system, comprising:
    a building automation system configured to control a chiller; and
    a control system configured to:
       operate the chiller over a range of operating capacities of the chiller;
       calculate a first efficiency value of the chiller at a first operating capacity of the chiller;
       calculate a plurality of second efficiency values of the chiller at a plurality of second operating capacities of the chiller;
       separate samples comprising the first efficiency value and the plurality of second efficiency values into a plurality of bins, wherein each bin of the plurality of bins represents a portion of the range of operating capacitates of the chiller;
       generate an efficiency curve for the chiller based on the samples in the plurality of bins; and
       communicate the efficiency curve to the building automation system.

11. The system of claim 10, wherein the building automation system is configured to control the chiller, one or more additional chillers, or both, based on the efficiency curve.

12. The system of claim 10, wherein the control system is configured to:
    receive data from the chiller; and
    calculate the first efficiency value and the plurality of second efficiency values based on the data received from the chiller.

13. The system of claim 10, wherein the control system is configured to preload one or more bins of the plurality of bins with predetermined samples based on a training cycle of the chiller.

14. The system of claim 10, wherein the control system is configured to preload one or more bins of the plurality of bins with predetermined samples based on one or more efficiency curves from an additional chiller, a chiller efficiency model, or both.

15. The system of claim 10, wherein the control system is configured to discard an existing sample in a first bin of the plurality of bins when a new sample is separated into the first bin, wherein the existing sample is randomly selected from a plurality of existing samples in the first bin or the existing sample is an oldest sample in the first bin.

16. A chiller, comprising:
a control system comprising a processor and a memory, wherein the control system is configured to:
operate the chiller over a range of operating capacities of the chiller;
calculate a first efficiency value of the chiller at a first operating capacity of the chiller;
calculate a plurality of second efficiency values of the chiller at a plurality of second operating capacities of the chiller;
separate samples comprising the first efficiency value and the plurality of second efficiency values into a plurality of bins, wherein each bin of the plurality of bins represents a portion of the range of operating capacities of the chiller; and
generate an efficiency curve for the chiller based on the samples in the plurality of bins.

17. The chiller of claim 16, wherein the control system is configured to:
receive a request for an efficiency estimate of the chiller a particular operating capacity; and
determine the efficiency estimate based on the efficiency curve in response to receipt of the request.

18. The chiller of claim 16, wherein the control system is configured to calculate the first efficiency value and the plurality of second efficiency values based on temperatures of water entering the chiller, temperatures of water existing the chiller, and power consumptions of the chiller.

19. The chiller of claim 16, wherein the control system is configured to communicate the efficiency curve to a building automation system configured to control the chiller based on the efficiency curve, and wherein the building automation system is configured to control at least one additional chiller.

20. The chiller of claim 16, wherein the control system is configured to preload one or more bins of the plurality of bins with predetermined samples based on a training cycle of the chiller.

* * * * *